US010852479B1

(12) United States Patent
Bhethanabotla et al.

(10) Patent No.: US 10,852,479 B1
(45) Date of Patent: Dec. 1, 2020

(54) DIGITAL FABRICATION OF A SMALL DIAMETER POLYMER OPTICAL WAVEGUIDE

(71) Applicants: Venkat Rama Bhethanabotla, Tampa, FL (US); Thomas M. Weller, Corvallis, OR (US); Roger Brandon Tipton, Wesley Chapel, FL (US); John Townsend Bentley, Tampa, FL (US); Eduardo Antonio Rojas, Port Orange, FL (US)

(72) Inventors: Venkat Rama Bhethanabotla, Tampa, FL (US); Thomas M. Weller, Corvallis, OR (US); Roger Brandon Tipton, Wesley Chapel, FL (US); John Townsend Bentley, Tampa, FL (US); Eduardo Antonio Rojas, Port Orange, FL (US)

(73) Assignee: University of South Florida, Tampa, FL (US)

(*) Notice: Subject to any disclaimer, the term of this patent is extended or adjusted under 35 U.S.C. 154(b) by 0 days.

(21) Appl. No.: 16/138,558

(22) Filed: Sep. 21, 2018

Related U.S. Application Data (60) Provisional application No. 62/561,505, filed on Sep. 21, 2017.

(51) Int. Cl.
*G02B 6/138* (2006.01)
*G02B 6/02* (2006.01)
*G02B 6/36* (2006.01)
*G02B 6/42* (2006.01)
*G02B 6/38* (2006.01)
(Continued)

(52) U.S. Cl.
CPC ......... *G02B 6/138* (2013.01); *G02B 6/02209* (2013.01); *G02B 6/3688* (2013.01); *G02B 6/3817* (2013.01); *G02B 6/4214* (2013.01); *B29C 64/00* (2017.08); *B29C 64/141* (2017.08); *G02B 2006/12171* (2013.01)

(58) Field of Classification Search
CPC .. G02B 6/138; G02B 6/02209; G02B 6/3688; G02B 6/4214; G02B 6/3817; G02B 6/12171
See application file for complete search history.

(56) References Cited

U.S. PATENT DOCUMENTS

| 2010/0150510 A1* | 6/2010 | Sato | G02B 6/138 385/130 |
| 2010/0316330 A1* | 12/2010 | Kim | G02B 6/138 385/14 |
| 2011/0276166 A1* | 11/2011 | Atanasoff | G01B 11/0625 700/104 |

OTHER PUBLICATIONS

Kobrinsky, M. J., et al. On-Chip Optical Interconnects. Intel Technology Journal, vol. 08, Issue 02, pp. 129-141 (May 10, 2004).
(Continued)

*Primary Examiner* — Ryan A Lepisto
*Assistant Examiner* — Erin D Chiem
(74) *Attorney, Agent, or Firm* — Michele L. Lawson; Smith & Hopen, P.A.

(57) ABSTRACT

A novel polymer optical waveguide and method of manufacturing is presented herein. A digitally manufactured process is described which utilizes a micro-dispensed UV optical adhesive as the contour guiding cladding, a fused deposition modeling technology for creating a core, additional optical adhesive to complete the cladding and a subtractive laser process to finish the two ends of the optical interconnect.

17 Claims, 9 Drawing Sheets

(51) Int. Cl.
*G02B 6/12* (2006.01)
*B29C 64/141* (2017.01)
*B29C 64/00* (2017.01)

(56) References Cited

OTHER PUBLICATIONS

Miller, D. A. B. Optical interconnects to electronic chips. Appl. Opt., vol. 49, No. 25, pp. F59-F70, (Sep. 1, 2010).

Keeler, G. A., et al. The Benefits of Ultrashort Optical Pulses in Optically Interconnected Systems. IEEE Journal of Selected Topics in Quantum Electronics, vol. 9, No. 2, pp. 477-485, (Mar./Apr. 2003).

Kuan-Neng, C., Kobrinsky, et al. Comparisons of Conventional, 3-D, Optical, and RF Interconnects for On-Chip Clock Distribution. IEEE Transactions on Electron Devices, vol. 51, No. 2, pp. 233-239, (Feb. 2004).

Miller, D. A. B. & Ozaktas, H. M. Limit to the Bit-Rate Capacity of Electrical Interconnects from the Aspect Ratio of the System Architecture. Journal of Parallel and Distributed Computing 41, 4252, pp. 1-20, (1997).

V. Thorat, et al. Plastic Optical Fiber. International Journal of Engineering Research and Reviews, vol. 2, Issue 4, pp. 95-105m (Oct.-Dec. 2014).

D. Bailey, E. W. in Practical Fiber Optics (ed D. B. Wright), Chapter 5 Connecting fibers, pp. 97-119 (Oxford: Newnes, 2003).

\* cited by examiner

Mold for fiber production

FIG. 1A 3D printing of single strand of PMMA

FIG. 1B 3D printing of strands across mold

FIG. 1C

Finished fiber Assembly with 7 strands with optical adhesive as cladding and finished for testing

DIGITAL FABRICATION OF A SMALL DIAMETER POLYMER OPTICAL WAVEGUIDE

CROSS REFERENCE TO RELATED APPLICATIONS

This application is a nonprovisional of and claims priority to U.S. Provisional Patent Application Ser. No. 62/561,505, entitled "Digital Fabrication of a Small Diameter Polymer Optical Waveguide", filed Sep. 21, 2017, the contents of which are hereby incorporated by reference into this disclosure.

FIELD OF INVENTION

This invention relates to optical waveguides. Specifically, the invention provides novel plastic optical waveguides and a novel process for manufacture.

BACKGROUND OF THE INVENTION

Interconnects are currently metal conductors and the amount of information that can be transferred is limited.

Electrical Interconnects

Signal attenuation is one of the largest issues of electrical interconnects due to resistance of the conductor and electric loss. These issues can be magnified at higher frequencies. Complex systems can be created to account for this with equalization and amplification up to the physical noise limitations.

One way to improve the performance of a conductor is to increase its cross-sectional area, which reduces the resistance. The downside to this is that the cost and physical size requirements of the conductor are increased which can limit the applications for this solution.

If size constraints are important, simply scaling the conductor down does not increase the bit rate capacity of the line due to the resistance x capacitance time constant of the wire which sets the shortest pulse that could readily be sent on the line. This makes the information carrying capacity of the electrical conductor independent of the size of the line. To better explain this, there are two types of electrical wiring, resistive capacitive (RC) and inductive capacitive (LC). Whether a line is RC or LC at a given frequency is primarily determined by its cross-sectional size which determines whether resistive (limited by the bulk resistance of the metal) or inductive (crowding of the current towards the surface of the wire) impedance dominates at a given frequency. At the gigahertz frequencies of modern electronics, interconnected lines on chips are RC controlled and off chip is LC controlled. (Kobrinsky, M. J. et al. On-Chip Optical Interconnects. *Intel Technology Journal* 8, 129-141 (2004); Miller, D. A. B. Optical interconnects to electronic chips. *Appl. Opt.* 49, F59-F70, (2010)).

The capacity of electrical lines from such resistive limits can be written approximately as:

$$B \le B_0 \frac{A}{L^2}$$

Where A is the cross-sectional area of the conductor, L is the length of the conductor, $B_0$ is a constant and is approximately $10^{16}$ for RC-limited lines on a chip and approximately $10^{17}$ for inductive capacitive lines with resistive loss for off-chip equalized RLC lines.

Another important consideration is that the overall energy consumption of computer systems is becoming ecologically significant and optical interconnects can help reduce this power consumption. The three main core operations of a computer system are logic switching, memory and interconnects where the interconnects amount for the highest energy dissipation. (Miller, D. A. B. Optical interconnects to electronic chips. *Appl. Opt.* 49, F59-F70, (2010)).

Optical Interconnects

When investigating other options to solve the problem of limited high frequency data transmission, optics is arguably the best option moving forward. In optical interconnects, the very low loss and dispersion of optical fiber allows for a much higher rate of information transmission. At short distances, optics can assist in interconnect density and interconnect power as well as improve signal integrity and timing. (Keeler, G. A. et al. The benefits of ultrashort optical pulses in optically interconnected systems. *IEEE Journal of Selected Topics in Quantum Electronics* 9, 477-485, (2003); Kuan-Neng, C., Kobrinsky, M. J., Barnett, B. C. & Reif, R. Comparisons of conventional, 3-D, optical, and RF interconnects for on-chip clock distribution. *IEEE Transactions on Electron Devices* 51, 233-239, (2004); Miller, D. A. B. & Ozaktas, H. M. Limit to the Bit-Rate Capacity of Electrical Interconnects from the Aspect Ratio of the System Architecture. *Journal of Parallel and Distributed Computing* 41, 42-52).

Light rays propagate via discreate paths through a fiber where each path is called a mode and corresponds to an angle of incidence. Different modes take different times to travel along the fiber. The total number of modes is defined by the numerical aperture which is given by:

$$NA = (n_1^2 - n_2^2)^{1/2} = n_0 \sin\left(\frac{\theta_a}{2}\right)$$

Where $n_0$=refractive index of the air, $n_1$=refractive index of the core, and $n_2$ is the refractive index of the cladding. The larger the difference in refractive index, the higher the number of modes which can be guided through the fiber. With a step index fiber, the number of possible modes $N_m$ is related by:

$$N_m - 0.5\left(\frac{\pi d NA}{\lambda}\right)^2$$

Where d is the diameter of the fiber and $\lambda$ is the wavelength of the light used. With these constraints in mind, a larger diameter fiber with larger delta n, and a lower wavelength light will lead to a fiber that transmits more information. (P. V. Thorat, S. W., P. A. Thombre. Plastic Optical Fiber. *International Journal of Engineering Research and Reviews* 2, 95-104 (2014)).

New optical interconnects are an interesting option but have fabrication and design related issues: (1) how to route optics through tight spaces without high losses due to scattering; (2) how to connect optics to light generating sources; and (3) how to increase the delta n and reduce the wavelength to increase the number of modes.

Accordingly, what is needed is an additive manufactured plastic optical interconnect that can be inexpensively mass produced can improve data transmission rates for a wide range of devices.

SUMMARY OF INVENTION

The inventors have demonstrated a novel optical interconnect using a digitally manufactured process utilizing a micro-dispensed UV optical adhesive as the guided cladding; a fused deposition modeling additive manufacturing process for creating a core; additional optical adhesive to complete the cladding; and a subtractive laser process to finish the two ends of the optical interconnect. The proposed technique can be applied to various board to board or chip to chip applications along with other applications and can be realized as a mass production process.

New polymer optical waveguides have been developed with high transmission rate and minimal bending losses with an effective mass production process that has been made possible through recent advances in digital manufacturing. High transmission rates include transmission rates of at least 25% while minimal bending losses include amounts up to, and including, 75%. Through a combination of micro-dispensing, Fused Deposition Modeling (FDM), and laser subtraction the inventors have created a new optical system with the ability to transmit large amounts of data through small diameter polymer waveguides with minimal bend losses. For reference, large amounts of data include those amounts that are transmitted by at least 0.5 GB/sec and a small diameter single mode fiber would have a maximum size of 9 microns while a small diameter multimode fiber includes sizes of 10 microns and above with exemplary multimode fiber sizes being 25, 50, 62.5 and 125 microns.

In an embodiment, a method of digitally manufacturing a polymer optical waveguide is presented comprising the steps of: micro-dispensing a first layer of optical adhesive into a guided channel base to form a cladding; using a fused deposition modeling additive manufacturing process to extrude a filament of a polymer into the guided channel base containing the first layer of optical adhesive to create a core; adding a second layer of optical adhesive to complete the cladding; and using a subtractive laser process to finish end facets of the polymer optical waveguide.

The optical adhesive may be UV curable in which case, the process further comprises curing the first layer of optical adhesive with UV light prior to the creation of the core and curing the second layer of optical adhesive with UV light after the creation of the core. After curing both layers, the second layer of optical adhesive joins the first layer of optical adhesive to form a tube-like structure encapsulating the core. Both the first and the second layer of optical adhesive may have a thickness of at least 10% of the core diameter. In some embodiments, the optical adhesive is cured in an inert atmosphere, such as under nitrogen.

The optical adhesive may be selected from the group consisting of urethanes, polyurethanes, acrylics, silicones, epoxies, cyanoacrylates, fluorinated polymers, and combinations thereof.

The polymer of the core may be a thermoplastic selected from the group consisting of acrylics such as poly(methyl methacrylate) (PMMA), synthetic resins, styrene copolymers such as polystyrene, transparent plastics such as polycarbonate and poly(methyl-1-pentene), cyclo olefin polymers (COP), cyclic olefin copolymer, amorphous fluoropolymers such as (poly(perfluoro-butenylvinyl ether) and cyclic transparent optical polymer (CYTOP™), and combinations thereof. The core may have a surface variation of less than 1 micron, or in some embodiments, of less than 500 nm with a diameter of about 50 microns.

The end facets may have a low root mean square (RMS) surface roughness which is smaller than a tenth of transmitted wavelength ($\lambda/10$) to pressure wave front geometry and can be aligned perpendicularly to incoming light rays. The laser used to finish the end facets may be a picosecond laser. In some embodiments, the polymer optical waveguide may be fabricated directly on a printed circuit board (PCB).

In another embodiment, a polymer optical waveguide is presented comprising: a cladding layer comprised of a UV curable optical adhesive; a core encapsulated by the cladding layer wherein the core comprises a polymer having a higher refractive index than the cladding layer; and end facets having a low root mean square (RMS) surface roughness smaller than a tenth of transmitted wavelength ($\lambda/10$) to pressure wave front geometry. The optical waveguide may have a high delta n of at least 0.123; use a low wavelength of light between about 520 nm to 1550 nm; and can continue to transmit light effectively at a tight bend radius of up to 3 mm. The waveguide may be multimode.

The optical adhesive may be selected from the group consisting of urethanes, polyurethanes, acrylics, silicones, epoxies, fluorinated polymers, and combinations thereof.

The polymer of the core may be a thermoplastic selected from the group consisting of acrylics such as poly(methyl methacrylate) (PMMA), synthetic resins, styrene copolymers such as polystyrene, transparent plastics such as polycarbonate and poly(methyl-1-pentene), cyclo olefin polymers (COP), cyclic olefin copolymer, amorphous fluoropolymers such as (poly(perfluoro-butenylvinyl ether) and cyclic transparent optical polymer (CYTOP™), and combinations thereof. The core may have a surface variation of less than 1 micron, or in some embodiments, of less than 425 nm with a diameter of 9 microns, about 25 microns, about 50 microns or about 62.5 microns. In some embodiments, the core is about 50 microns.

In another embodiment, a method of digitally manufacturing a polymer optical waveguide is presented comprising the steps of: micro-dispensing an optical adhesive into a guided channel base to form a cladding; using a fused deposition modeling additive manufacturing process to extrude a filament of a polymer into the center of the cladding to create a core; and using a subtractive laser process to finish end facets of the polymer optical waveguide.

The optical adhesive may be selected from the group consisting of urethanes, polyurethanes, acrylics, silicones, epoxies, cyanoacrylates, fluorinated polymers, and combinations thereof.

The polymer of the core may be a thermoplastic selected from the group consisting of acrylics such as poly(methyl methacrylate) (PMMA), synthetic resins, styrene copolymers such as polystyrene, transparent plastics such as polycarbonate and poly(methyl-1-pentene), cyclo olefin polymers (COP), cyclic olefin copolymer, amorphous fluoropolymers such as (poly(perfluoro-butenylvinyl ether) and cyclic transparent optical polymer (CYTOP™) and combinations thereof. The core may have a surface variation of less than 1 micron, or in some embodiments, of less than 500 nm with a diameter of about 50 microns.

BRIEF DESCRIPTION OF THE DRAWINGS

For a fuller understanding of the invention, reference should be made to the following detailed description, taken in connection with the accompanying drawings, in which:

FIG. 2 is a series of images depicting numerical simulation of optical interconnect using COMSOL Ray Tracing. A 50-micron fiber was modeled, and 4,000 rays of light were injected into the fiber. Decreasing bend radii were evaluated until a critical angle was reached and light escapes the fiber. Simulations show that high transmission rates down to 3 mm can be achieved.

FIG. 3 is a series of images depicting SEM results indicated a smooth optical core. Surface variation of less than 425 nm which is much less than the 1 micron required for acceptable transmission. The largest variation observed was about 425 nm, which is less than the 1 micron "ledge" where transmittance falls rapidly.

DETAILED DESCRIPTION OF THE PREFERRED EMBODIMENT

In the following detailed description of the preferred embodiments, reference is made to the accompanying drawings, which form a part hereof, and within which are shown by way of illustration specific embodiments by which the invention may be practiced. It is to be understood that other embodiments may be utilized, and structural changes may be made without departing from the scope of the invention.

Definitions

All numerical designations, including ranges, are approximations which are varied up or down by increments of 1.0 or 0.1, as appropriate. It is to be understood, even if it is not always explicitly stated that all numerical designations are preceded by the term "about". It is also to be understood, even if it is not always explicitly stated, that the reagents described herein are merely exemplary and that equivalents of such are known in the art and can be substituted for the reagents explicitly stated herein.

The term "about" or "approximately" as used herein refers to being within an acceptable error range for the particular value as determined by one of ordinary skill in the art, which will depend in part on how the value is measured or determined, i.e. the limitations of the measurement system, i.e. the degree of precision required for a particular purpose. As used herein, the term "about" refers to ±10%.

As used in the specification and claims, the singular form "a", "an" and "the" include plural references unless the context clearly dictates otherwise.

"Polymer" as used herein refers to a relatively high molecular weight organic compound, natural or synthetic, whose structure can be represented by a repeated small unit, the monomer. Synthetic polymers are typically formed by addition or condensation polymerization of monomers.

"Copolymer" as used herein refers to a polymer formed from two or more different repeating units (monomer residues).

"Optical adhesives" as used herein refers to either single or multiple component materials that may cure when exposed to ultraviolet or blue light. Examples of optical adhesives include, but are not limited to, urethanes, polyurethanes, acrylics, silicones, epoxies, cyanoacrylates, fluorinated polymers and combinations thereof.

"Cladding" as used herein refers to one or multiple layers of an optical adhesive having a lower refractive index surrounding a core made of a thermoplastic or glass material having a higher refractive index than the cladding. The cladding functions to trap light within the core by total internal reflection at the boundary between the cladding and the core. The inventors either embed the core into the cladding or apply the cladding on the core and subsequently In an embodiment, formation of the tube-shaped cladding in the invention is accomplished by a multistep process in which a first layer of optical adhesive is deposited in a guide channel and UV cured, after which the core is deposited onto the first layer of the optical adhesive. A second layer of optical adhesive is then deposited on top of the core material and UV cured to complete the tube-shaped cladding surrounding the core. In another embodiment, the cladding is formed first and then the core is injected into the center of the cladding to embed it within the cladding. Cladding typically has an inner diameter of the core material and an outer diameter equal to between about 62.5 microns to about 125 microns, however the instantly claimed process allows for much more flexibility. With the instant process, the cladding material can be a minimum of 10% larger than the core with a maximum being as thick as needed in order to change heights to mate up to different components. The process of the instant invention allows for dispensing the cladding in three dimensions (3D) so the cladding thickness can reach up to 5 mm, for example, if it was needed.

"Core" as used herein refers to the light transmission area of an optical interconnect or waveguide which is manufactured of a polymer, preferably a thermoplastic, having a higher refractive index than the cladding material surrounding it. While the core is described as being a polymer, other materials such as glass are capable of being used in the fused deposition modeling process of creating the core.

"Thermoplastic" as used herein refers to substances that become plastic upon heating and harden upon cooling and retain these properties upon repeating these processes. The thermoplastics used herein are clear and have a higher refractive index as compared to the cladding material used. Examples include, but are not limited to, acrylics such as poly(methyl methacrylate) (PMMA), synthetic resins, styrene copolymers such as polystyrene, transparent plastics such as polycarbonate and poly(methyl-1-pentene), cyclo olefin polymers (COP), cyclic olefin copolymer, amorphous fluoropolymers such as (poly(perfluoro-butenylvinyl ether) and cyclic transparent optical polymer (CYTOP™) or combinations thereof.

"Waveguide" or "optical waveguide" as used herein refers to a structure used to guide light by restricting the spatial region in which the light can propagate. "Optical interconnect" is used synonymously with "optical waveguide" herein.

The recent development of digital manufacturing has opened a new chapter of research in optical devices. Equipment that can dispense liquids, extrude advanced materials and reductive technologies like lasers are all incorporated into the same manufacturing process and can lead to the development of innovative new technologies. Utilizing this new digital technology for optical fibers, the inventors have developed new optical devices that can transmit massive amounts of data, up to 40 GB/sec, and can be routed through tight spaces as well as enable new sensors to better understand the world around us and medical devices to improve the human condition. Typical commercial transmission rates for plastic optical fibers are about 1 GB/sec with some approaching 2.5 GB/sec.

Optical Interconnects in Electrical Devices

Moving optical interconnects down to electronic devices requires the development of several new technologies. Vertical-cavity-surface-emitting lasers were the first technology to be created that can emit tiny semiconducting light waves. The next technology required is tiny optical fibers that can easily be "shaped" through small spaces. Conventional silica optical fiber is one solution, but they are difficult for assembly at this size and can scatter light significantly if subjected to tight turns. Silica fibers also use very small delta n values and typically use an infrared wavelength of light. Extruded plastic optical fibers have been developed and they are used primary as large connectors outside the computer to connect servers together or to connect servers to network devices. The currently used fabrication methods for extruded plastic fibers can only produce large cables and are incapable of producing small interconnects.

A new digitally manufactured plastic optical interconnect has been developed that overcomes these issues with standard silica optical fibers and standard plastic optical fibers. The novel process allows for fabrication of small optical interconnects directly on a board which is not possible with the currently used fabrication methods. The fabricated interconnects are capable of being fabricated on the board itself to interconnect various components on the board or alternatively, the process can be used to fabricate interconnects used to connect two boards, or a board to other components, together.

Using a micro-dispensed UV curable urethane as a cladding, the inventors created a 3-dimensional channel using Fused Deposition Modeling (FDM), an additive manufacturing process, to place a core of polymethyl methacrylate (PPMA) inside the channel, applied more micro-dispensed UV curable urethane to complete the cladding and completed the interconnect using a picosecond laser to finish off the end facets of the interconnect so they can be connected to a laser light source and a detector. In another embodiment, the cladding is formed first and then the core is injected into the center of the cladding to embed it within the cladding. With current digital manufacturing equipment, these interconnects can be mass produced as well.

The plastic optical fiber fabricated using the novel method has a high delta n of 0.123, uses a low wavelength of light at 520 nm to 1550 nm, and can continue to transmit light effectively at tight bend radius of up to 3 mm. In some embodiments, the wavelength of the light is 570 nm to 650 nm. For reference, the max n is about 1.53 (for COP material) and the minimum n number is about 1.3 currently but can be lower. Mixing and matching cores and cladding materials produces different delta n which can change the transmission rates and bend optimization thus the novel manufacturing process can be used to tailor the fiber to different applications. Similarly, different wavelengths of light can be used to optimize performance for different applications. For example, lower wavelengths can be used for better bend performance and higher wavelengths can be used for better transmission rates. The standard wavelengths used in the field currently are about 850 nm.

The use of optical adhesive allows for even more customization, depending on the variables of the material such as, modulus of elasticity, elongation at failure and hardness in Shore D. Depending on the specific use, the modulus of elasticity can be between 25 to 250 MPA; the elongation at failure can be between 1 to 100 MPA and the hardness can be between 1 to 75 Shore D.

Methods

Optical Interconnect Fabrication

Micro-dispense a UV curable optical adhesive into a guided channel base cladding material. The material used was a Norland NOA 1369 low refractive index adhesive (1.369) at 2100 centipoises. The Norland NOA 1369 is a urethane based on 70-85% aliphatic urethane acrylate and 15-30% acrylate monomer. The modulus of elasticity of the adhesive is 73 MPA with a tensile strength of 7.8 MPA, an elongation at failure of 52% and a hardness of 30 Shore D.

Cure the guided channel base cladding material with a UV light. Depending on UV wavelength and power, the curing time can be between about 10 seconds to 10 minutes. The specific channel base cladding material used in this example must be cured with UV light between 315 to 395 nm with full cure requiring 6 Joules/cm$^2$. The adhesive used in this example exhibits oxygen inhibition when used as a coating and to overcome this, the adhesive must be cured under an inert atmosphere such as nitrogen. Other optical adhesives can be used with the novel method described herein which do not require curing in an inert atmosphere. The refractive index of both the core and the cladding can be changed to optimize the product for the specific application.

Using an nScrypt digital manufacturing workstation, the inventors used Fusion Deposition Modeling to extrude a single filament of polymethyl methacrylate (PMMA), with a refractive index of 1.492, from one standoff of the guided channel base cladding to the other standoff. Proper extrusion speed and traverse speed must be maintained to create a consistent filament diameter and correct tension on the filament to create a uniform core. Temperature, extrusion speed, traverse speed, and nozzle design are important variables that can be adjusted according to the various application.

PMMA has a high transmission rate of over 98% over 3 mm with a single window at 550-650 nm wavelengths suitable for optic fiber communication at theoretically 55 dB/km at 570 nm. (P. V. Thorat, S. W., P. A. Thombre. Plastic Optical Fiber. *International Journal of Engineering Research and Reviews* 2, 95-104 (2014)).

Additional micro-dispensed UV curable optical adhesive is applied to the guided channel cladding/PMMA core to completely encapsulate the core in optical adhesive. The core needs to be completely enclosed with at least a 10% of core diameter coating, up to any thickness needed for the routing. This can be accomplished with embedding the core in the cladding or adding more cladding afterwards, both of which processes are described herein.

The new layer of optical adhesive is UV cured. Light, which transmits through an optical waveguide, passes through the ends of the optically transparent structure, which are commonly referred to as end facets. These surfaces must exhibit specific characteristics to minimize the coupling losses, and therefore the optical attenuation, of the transmission path. It is required that the end facets are flat and smooth, having a low root mean square (RMS) surface roughness which is smaller than a tenth of the transmitted wavelength ($\lambda/10$) to pressure wave front geometry. For example, for the wavelength of 532 nm, the RMS would need to be less than 53 nm. Wavelengths that can be used with the fabrication method described herein range from about 500 nm to 1550 nm. For this experiment the end facets were prepared using a cutting process and then manually polishing with abrasive sheets with increasingly smaller grain sizes. (Wolfer, T., Bollgruen, P., Mager, D., Overmeyer, L. & Korvink, J. G. Printing and preparation of integrated optical waveguides for optronic sensor networks. *Mechatronics* 34, 119-127, (2016)).

Numerical Methods

Optical fibers are typically broken into two groups, single-mode fibers with a comparatively small core which requires the wave model of light, and multimode fibers, whose core is large enough to be analyzed with a geometric ray-tracing model. (P. V. Thorat, S. W., P. A. Thombre. Plastic Optical Fiber. *International Journal of Engineering Research and Reviews* 2, 95-104 (2014)). The boundary of the two groups is determined by the structural parameter V:

$$V = \frac{2\pi\rho}{\lambda}(n_{co}^2 - n_{cl}^2)^{1/2}$$

At a core diameter of 50 micron with the novel PMMA fiber and optical adhesive cladding, the inventors are well into the multimode fiber range with over 4,000 modes.

Figure 1A:
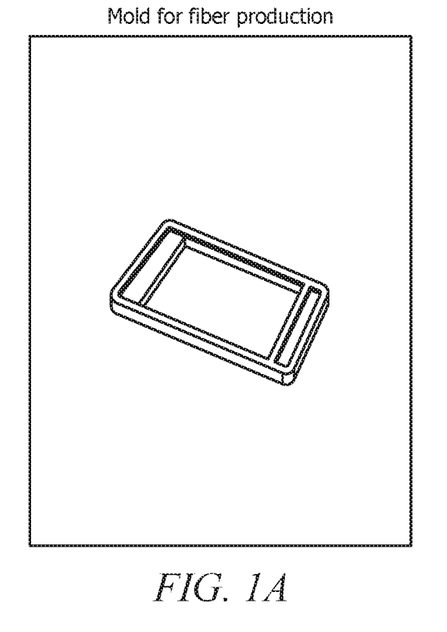
FIGS. 1A-D are a series of images depicting the fabrication of optical interconnect. (A) a guided channel base cladding; (B) FDM printing of a filament; (C) multiple fiber printing; (D) finished optical assembly. Through a combination of micro-dispensing, fused deposition modeling (FDM), and laser subtraction, a new plastic optical waveguide with high transmission rates and 3D curvature has been developed.
Figure 1B:
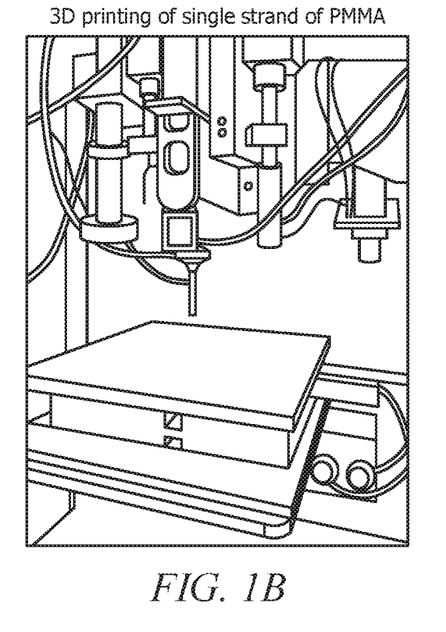
Figure 1C:
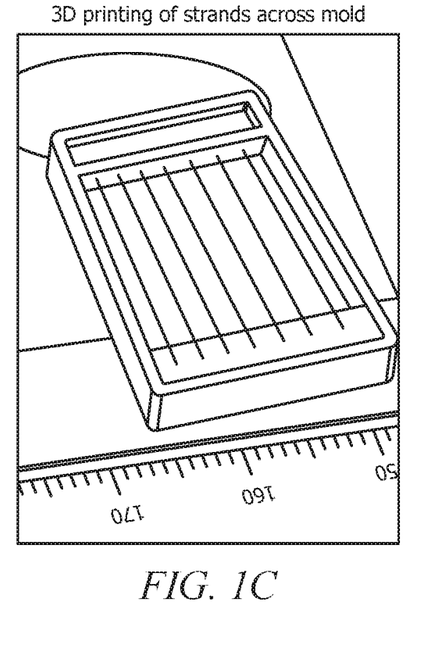
Figure 1D:
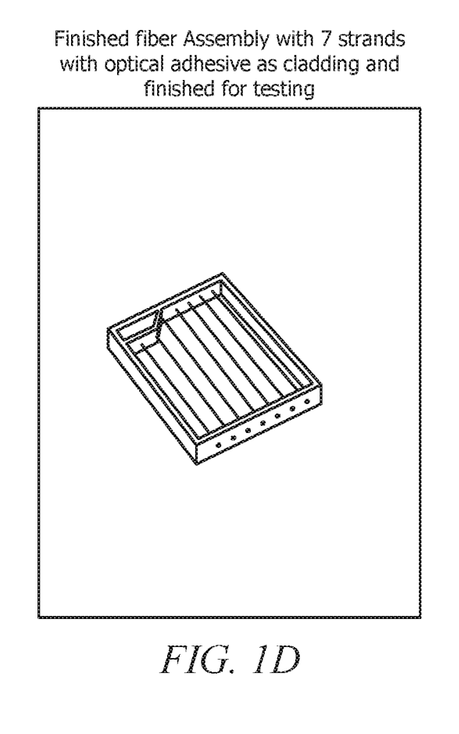
Figure 2:
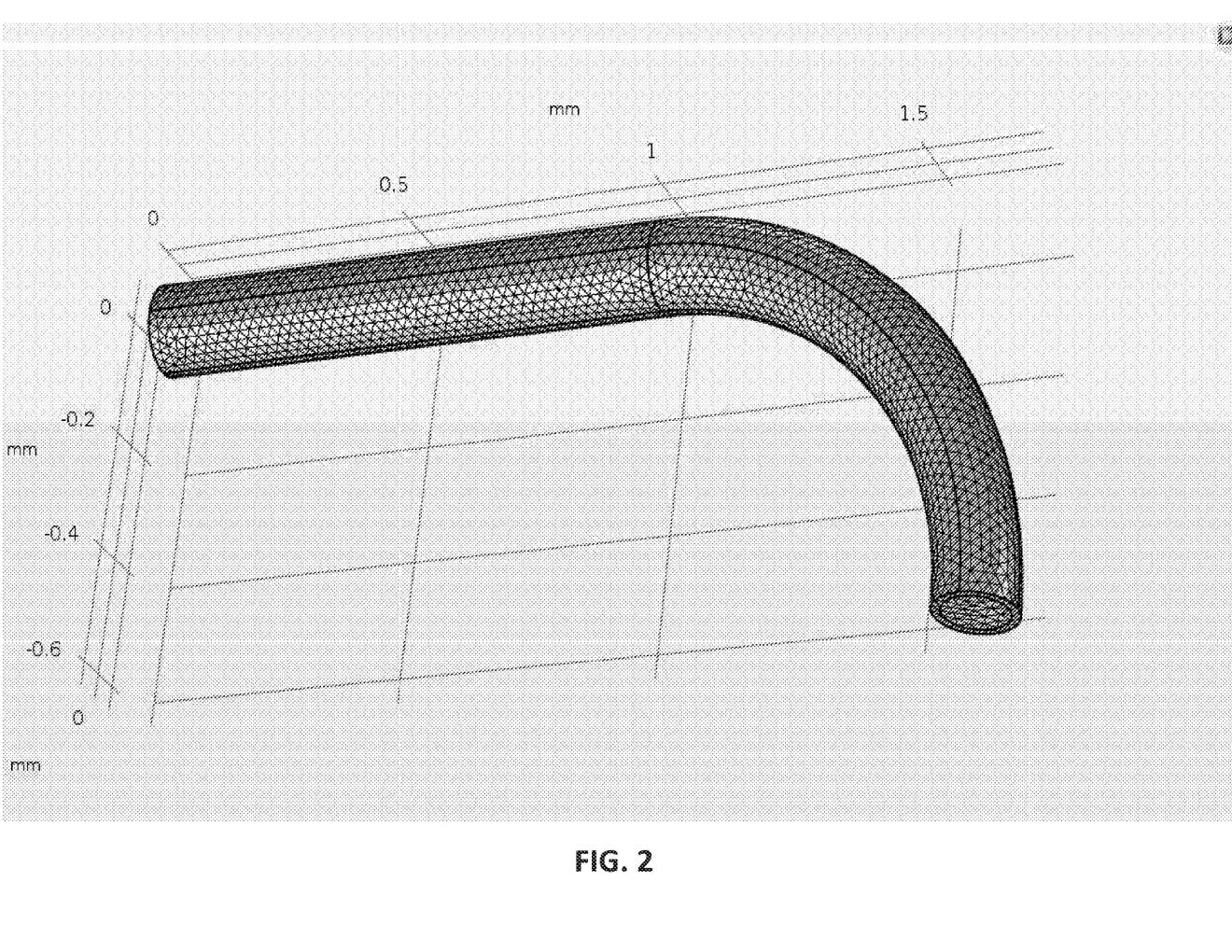

Numerical simulations of the optical interconnect were performed using COMSOL with the Ray Tracing Module. The simulations confirmed that the inventors should have nearly 100% transmission for the 50-micron diameter core optical interconnect. For reference, single mode cores are about 9 microns with common multi-mode sizes being 25, 50, 62.5 and 125 microns.

For industrial applications in which optical interconnects are needed to route through tight spaces, curved fibers are required. The simulations show that the waveguide can successfully accommodate curves as tight at 0.3 mm without significant losses.

The surface roughness of optical fibers directly affects the optical reflectivity of the interface between the fiber and cladding and is important for the construction of an optical interconnect.

Figure 3:
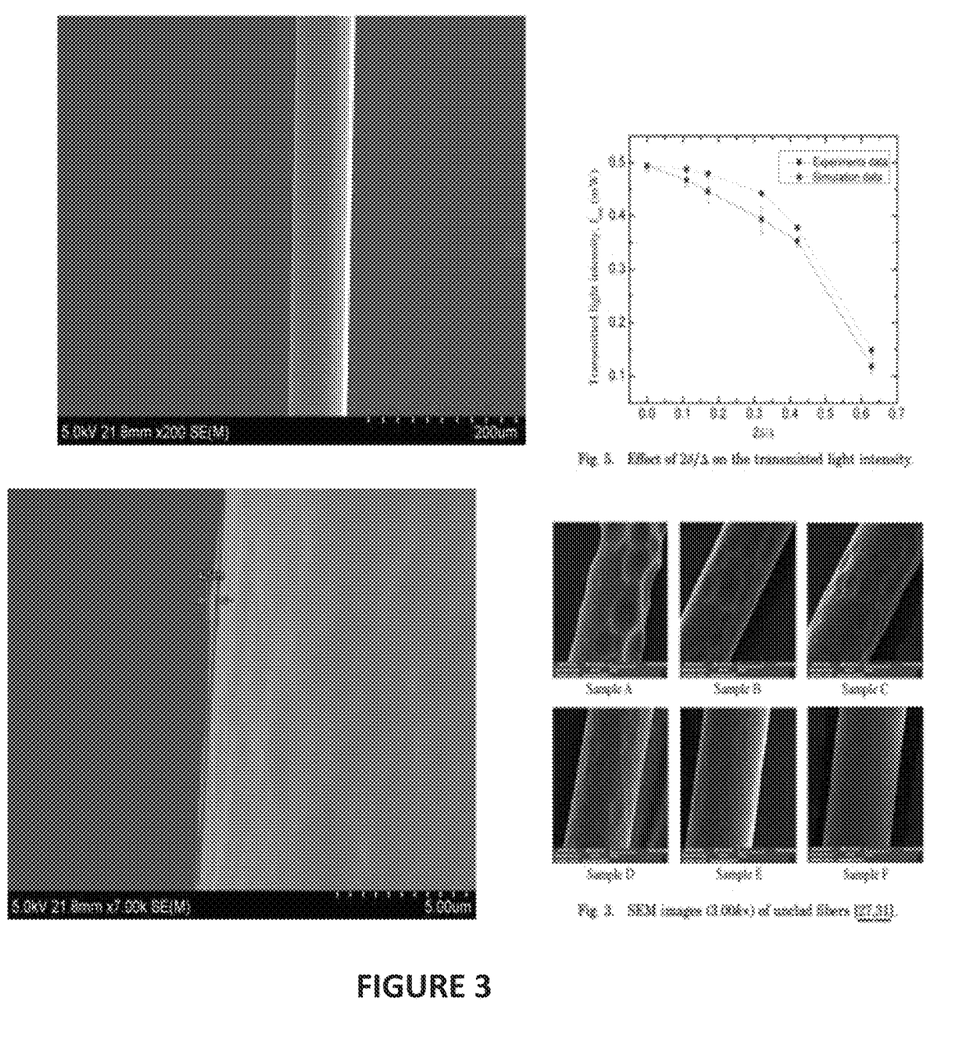

Unclad fibers were evaluated using SEM. The surface of the PMMA core is smooth with a surface variation of less than 425 nm. This smooth surface is critical for total internal reflection to take place. For the core diameter of 50 microns, the inventors need a surface variation of less than 1 micron for a high transmission optical fiber. This ratio can be applied to other core diameters. (Zhong, N. et al. Effects of surface roughness on optical properties and sensitivity of fiber-optic evanescent wave sensors. *Appl. Opt.* 52, 3937-3945, (2013)). The inventors are able to fabricate a core using the novel process which has a surface variation of less than 500 nm.

Results

Figure 4A:
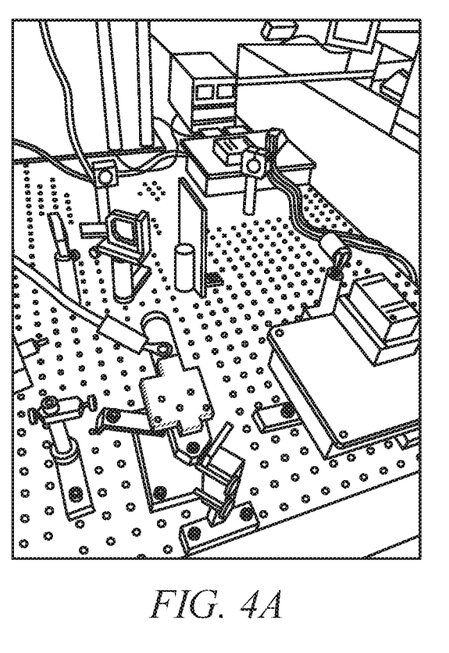
FIG. 4A-C is a series of images depicting laser evaluation of the digitally manufactured plastic optical waveguide. Shown in the images is (A) the actual laser test station setup; (B) the test sample in the rig with 532 nm wavelength laser being used for testing; and (C) actual transmission of light through the fabricated plastic optical waveguide. Initial testing in the laser lab indicates initial transmission of about 46% on proof of concept samples.
Figure 4B:
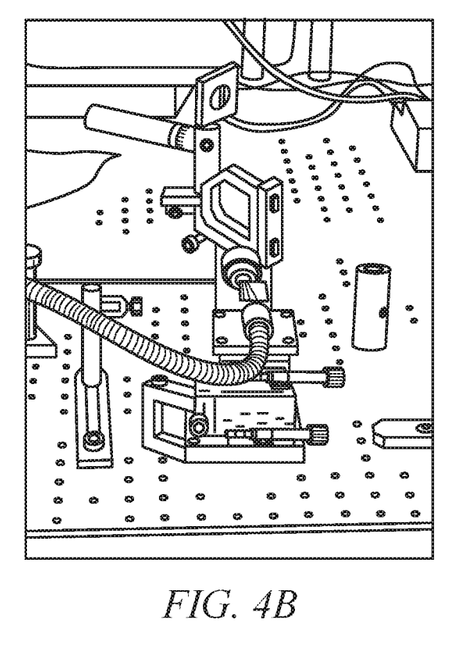
Figure 4C:
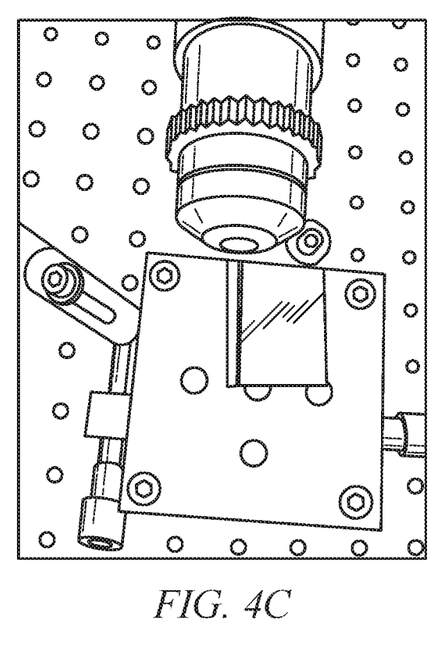

A laser test work station was set up to test the light transmission capability of the novel optical interconnect. A 532 nm laser was used and was filtered down to 1.32 mW of power at the inlet of the fiber. The optical interconnect averaged a transmission of 45.6% in the testing. End facet preparation is likely a major source of loss in the system as the surface quality was not evaluated. Simulations have shown transmission rates in the mid-90% range.

End facets must be aligned perpendicularly to the incoming light rays and must be located at a specific geometrical position in relation to the surrounding optical sources and detectors. The end facet for a single mode fiber needs to be less than 1 micron (5 microns for multimode fibers) in x, y, and z out of center. This may be a source of loss in the system as the inventors did not have a theta stage to optimize the alignment. (D. Bailey, E. W. in *Practical Fiber Optics* (ed D. B. Wright) 97-119 (Oxford: Newnes, 2003)). This creates a demand for a specifically adapted process, such as the laser reduction process with nScrypt picosecond laser used by the inventors in this example Processing the end facets with the laser allows the entire production process to be completed in the same machine. In other words, the process can be completed on computer printed circuit boards (PCB) directly whereas it would be difficult to process the end facets any other way.

CONCLUSIONS

The inventors have demonstrated a novel optical interconnect using a digitally manufactured process utilizing a micro-dispensed UV optical adhesive as the contour guiding cladding, a fused deposition modeling technology for creating a core, additional optical adhesive to complete the cladding and a subtractive laser process to finish the two ends of the optical interconnect. The proposed technique can be applied to various board to board or board to chip applications and can be realized as a mass production process.

The inventors fabricate and test new samples to determine the minimum fiber sizes that can be fabricated as well as test bent fiber samples to determine transmission capabilities. Fibers of 11 microns, 9 microns, and even smaller can be fabricated using the novel method. The inventors also develop capabilities to fabricate 3D shapes with precise x, y, z end facet locations; fabricate and test prototype devices for industrial testing; and create a device fabrication industrial process.

With regard to 3D shapes, the optical interconnects described herein are fabricated directly on the printed circuit boards (PCB) by placing the fibers and end facets precisely on the board allowing for everything to line up when components are placed on the board.

The commercial fabrication process includes putting a bare PCB in the machine to apply a base plastic layer in different thickness and routings on the board to get the interconnects at the right levels and positions. The cladding is then micro-dispensed after which the core material is extruded into the cladding. Either the process in which a first layer of cladding material is micro-dispensed into a channel, the core extruded onto the first layer of cladding material and a second layer of cladding material added or the embedding process in which the cladding material is micro-dispensed and the core material is injected into the center of the core material, can be used. After the cladding and core are fabricated, a subtractive laser is used to finish the end facets. The finished board can then be removed from the machine, packaged, and shipped.

In the preceding specification, all documents, acts, or information disclosed does not constitute an admission that the document, act, or information of any combination thereof was publicly available, known to the public, part of the general knowledge in the art, or was known to be relevant to solve any problem at the time of priority.

The disclosures of all publications cited above are expressly incorporated herein by reference, each in its entirety, to the same extent as if each were incorporated by reference individually.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall there between. Now that the invention has been described.

What is claimed is:

1. A method of digitally manufacturing a polymer optical waveguide comprising:
    micro-dispensing a first layer of ultraviolet light (UV) curable optical adhesive having a low refractive index into a guided channel base to form a cladding;
    using a fused deposition modeling additive manufacturing process to extrude a filament of a polymer having a higher refractive index than the refractive index of the cladding embedded into the guided channel base containing the first layer of optical adhesive to create a core;
    adding a second layer of optical adhesive to complete the cladding; and
    using a subtractive laser process to finish end facets of the polymer optical waveguide;
    wherein both the first and the second layer of optical adhesive have a thickness of at least 10% of core diameter.

2. The method of claim 1, wherein the optical adhesive is UV curable in an inert atmosphere.

3. The method of claim 2, further comprising curing the first layer of optical adhesive with UV light prior to the creation of the core.

4. The method of claim 3, further comprising curing the second layer of optical adhesive with UV light after the creation of the core.

5. The method of claim 4, wherein the second layer of optical adhesive joins the first layer of optical adhesive to form a tube-like structure encapsulating the core.

6. The method of claim 1, wherein the end facets are flat and smooth.

7. The method of claim 1, wherein the optical adhesive is selected from the group consisting of urethanes, polyurethanes, acrylics, silicones, epoxies, cyanoacrylates, fluorinated polymers, and combinations thereof.

8. The method of claim 1, wherein the polymer of the core is a thermoplastic selected from the group consisting of acrylics such as poly(methyl methacrylate) (PMMA), synthetic resins, styrene copolymers such as polystyrene, transparent plastics such as polycarbonate and poly(methyl-1-pentene), cyclo olefin polymers (COP), cyclic olefin copolymer, amorphous fluoropolymers such as (poly(perfluoro-butenylvinyl ether) and cyclic transparent optical polymer (CYTOP™), and combinations thereof.

9. The method of claim 1, wherein the core has a surface variation of less than 500 nm.

10. The method of claim 1, wherein the end facets have a low root mean square (RMS) surface roughness which is smaller than a tenth of transmitted wavelength ($\lambda/10$) to pressure wave front geometry.

11. The method of claim 1, wherein the end facets are aligned perpendicularly to incoming light rays.

12. The method of claim 1, wherein the laser is a picosecond laser.

13. The method of claim 1, wherein the core has a diameter selected from the group consisting of about 9 microns, about 25 microns, about 50 microns and about 62.5 microns.

14. The method of claim 1, wherein the polymer optical waveguide is fabricated directly on a printed circuit board.

15. A method of digitally manufacturing a polymer optical waveguide comprising:
    micro-dispensing an ultraviolet light (UV) curable optical adhesive having a low refractive index into a guided channel base to form a cladding;
    using a fused deposition modeling additive manufacturing process to extrude a filament of a polymer embedded into a center of the cladding to create a core having a higher refractive index than the refractive index of the cladding; and
    using a subtractive laser process to finish end facets of the polymer optical waveguide;
    wherein the core is embedded within the cladding;
    wherein thickness of the cladding is at least 10% of core diameter.

16. The method of claim 15, wherein the optical adhesive is selected from the group consisting of urethanes, polyurethanes, acrylics, silicones, epoxies, cyanoacrylates, fluorinated polymers, and combinations thereof.

17. The method of claim 15, wherein the polymer of the core is a thermoplastic selected from the group consisting of acrylics such as poly(methyl methacrylate) (PMMA), synthetic resins, styrene copolymers such as polystyrene, transparent plastics such as polycarbonate and poly(methyl-1-pentene), cyclo olefin polymers (COP), cyclic olefin copolymer, amorphous fluoropolymers such as (poly(perfluoro-butenylvinyl ether) and cyclic transparent optical polymer (CYTOP™), and combinations thereof.

* * * * *